(12) United States Patent
Kerrom

(10) Patent No.: US 8,375,806 B2
(45) Date of Patent: Feb. 19, 2013

(54) ELECTRODE SHAFT FOR A MAGNETO-INDUCTIVE FLOW MEASURING DEVICE HAVING A PLURALITY OF FRUSTOCONICAL SEALING LIPS

(75) Inventor: Roger Kerrom, Lorrach (DE)

(73) Assignee: Endress + Hauser Flowtec AG, Reinach (CH)

( * ) Notice: Subject to any disclaimer, the term of this patent is extended or adjusted under 35 U.S.C. 154(b) by 336 days.

(21) Appl. No.: 12/734,817

(22) PCT Filed: Dec. 4, 2008

(86) PCT No.: PCT/EP2008/066767
§ 371 (c)(1),
(2), (4) Date: May 26, 2010

(87) PCT Pub. No.: WO2009/071615
PCT Pub. Date: Jun. 11, 2009

(65) Prior Publication Data
US 2010/0300212 A1 Dec. 2, 2010

(30) Foreign Application Priority Data
Dec. 5, 2007 (DE) .......................... 10 2007 058 898

(51) Int. Cl.
*G01F 1/58* (2006.01)
(52) U.S. Cl. .................................... 73/861.12
(58) Field of Classification Search .......... None
See application file for complete search history.

(56) References Cited

U.S. PATENT DOCUMENTS

| 3,180,144 A | | 4/1965 | Bennett | |
| 5,847,287 A | * | 12/1998 | Davis | 73/861.15 |
| 5,955,681 A | * | 9/1999 | Hafner et al. | 73/861.17 |

FOREIGN PATENT DOCUMENTS

| DE | 1 098 727 | 10/1959 |
| DE | 33 44 679 A1 | 6/1985 |
| DE | 196 34 383 A1 | 3/1998 |
| EP | 0 892 252 A1 | 1/1999 |
| EP | 1 519 160 A2 | 3/2005 |
| JP | 58-172515 | 10/1983 |
| WO | WO 2008/059020 A1 | 5/2008 |

OTHER PUBLICATIONS

English translation for WO 2008/059020 (May 22, 2008) translated through http://worldwide.espacenet.com/ on Jun. 20, 2012.*

* cited by examiner

*Primary Examiner* — Harshad R Patel
(74) *Attorney, Agent, or Firm* — Bacon & Thomas, PLLC

(57) ABSTRACT

An electrode for a magneto-inductive flow measuring device for determining volume flow of an electricity conductive medium flowing through a measuring tube. The measuring tube, or at least a portion of it which comes in contact with the medium, is not electrically conductive; wherein the electrode exhibits an electrode shaft and an electrode head. The electrode head contacts the medium, and the electrode shaft exhibits frustoconically shaped sealing lips arranged one after the other in the direction of the longitudinal axis of the electrode. The electrode shaft is pressed into a bore in the wall of the measuring tube. The maximum diameter of the sealing lip nearest the electrode head is greater than the diameter of the bore, and, at least in a part of the electrode shaft, the maximum diameter of any following sealing lip is greater than the maximum diameter of the preceding sealing lip.

9 Claims, 2 Drawing Sheets

is not electrically conductive; wherein the electrode exhibits an electrode shaft and an electrode head; wherein the electrode head is in contact with the medium; wherein the electrode shaft exhibits frustoconical sealing lips arranged one after the other in the direction of the longitudinal axis of the electrode; and wherein the electrode shaft is pressed into a bore in the wall of the measuring tube.

ELECTRODE SHAFT FOR A MAGNETO-INDUCTIVE FLOW MEASURING DEVICE HAVING A PLURALITY OF FRUSTOCONICAL SEALING LIPS

TECHNICAL FIELD

The invention relates to an electrode for a magneto-inductive flow measuring device for determining the volume flow of an electrically conductive medium flowing through a measuring tube, wherein the measuring tube (or at least the portion of it which comes in contact with the medium) is not electrically conductive; wherein the electrode exhibits an electrode shaft and an electrode head; wherein the electrode head is in contact with the medium; wherein the electrode shaft exhibits frustoconical sealing lips arranged one after the other in the direction of the longitudinal axis of the electrode; and wherein the electrode shaft is pressed into a bore in the wall of the measuring tube.

BACKGROUND DISCUSSION

For the measuring of volumetric flow, magneto-inductive flow measuring devices make use of the principle of electrodynamic induction: Charge carriers moving perpendicular to a magnetic field in the medium induce a voltage in electrodes which likewise are essentially perpendicular to the flow direction of the medium, and perpendicular to the direction of the magnetic field. The measurement voltage produced in the electrodes is proportional to the flow volume of the medium averaged over the cross section of the measuring tube, and therefore proportional to the volume flow rate. If the density of the medium is known, the mass flow in the pipeline and/or the measuring tube can be determined. The measurement voltage is usually tapped via an electrode pair, which is situated in that area of the measuring tube in which the maximum magnetic field strength—and thus the maximum measurement voltage—is to be expected. The electrodes are typically galvanically coupled with the medium; however, magneto-inductive flow measuring devices with capacitively coupled contactless electrodes are also known.

The measuring tube can either be produced from electrically conductive material, e.g. stainless steel, or from an electrically insulating material. If the measuring tube is made of an electrically conductive material, the portion of it coming in contact with the medium must be coated with an electrically insulating liner. Depending on temperature and medium, the liner can be made, for example, of a thermoplastic, a thermosetting plastic or an elastomeric plastic. There are, however, also magneto-inductive flow measuring devices with a ceramic lining.

An electrode can be roughly divided into an electrode head, which is at least partially in contact with a medium which flows through the measuring tube; and an electrode shaft, which is almost completely inserted in the wall of the measuring tube.

The electrodes are, along with the magnet system, the central components of a magneto-inductive flow measuring device. With regard to the design and arrangement of the electrodes, it is important to ensure that they can be installed in the measuring tube as easily as possible, and that, subsequently, no leakage problems occur during the measurement process. The electrodes should furthermore exhibit both a sensitive and low-disturbance registering of measurement signals.

In addition to those electrodes that serve to pick up a measurement signal, further electrodes are often built into the sides of the measuring tube, e.g. a reference or grounding electrode for the electrical reference potential between the measuring device and the medium, or a medium-monitoring electrode for detecting partially-filled or empty measuring tubes.

Ultimately, electrode construction types can be divided into two categories:
- those inserted and installed in the measuring tube externally and
- those inserted and installed in the measuring tube internally.

With regard to the first type, the design of the electrode head is limited by the diameter of the bore: an external mount is only possible when the diameter of the electrode head is smaller than or equal to that of the bore in the wall of the measuring tube in which the electrode is placed. Preferable among externally mounted electrodes are rod electrodes, for example as described in European Patent EP 0 892 252 A1. Rod electrodes are preferable for installation in measuring tubes with small nominal diameters; that is to say, in areas where internal mounting is difficult or impossible to achieve on account of the small dimensions. The use of rod electrodes is not, however, solely limited to magneto-inductive flow measuring devices with small nominal diameters.

For the second electrode construction type, the restrictions concerning the dimensions of the electrode head do not apply; in this case the electrode shaft must simply be designed in such a way that it can be mounted in the bore. Depending on its application, the electrode head can vary widely in both size and shape. Internally mountable electrodes typically have, for example, mushroom, lentil or plate-shaped electrode heads.

Electrodes are normally set liquid-tight in a bore in the wall of a measuring tube. This is achieved through rows of frustoconically shaped sealing lips along the length of the electrode in the area of the electrode shaft, as is, for example, described in the prior noted European Patent, EP 0 892 252 A1. Rod electrodes can be mounted without difficulty in a plastic or plastic-lined measuring tube with a large nominal diameter. The rows of frustoconically shaped sealing lips along the length of the electrode serve both to hold the electrode in place and to seal the interior of the measuring tube off from the external environment.

When a rod electrode is pressed into a pre-made bore in the wall of a measuring tube, mechanical stresses are produced, especially if the diameter of the bore is smaller than the outside diameter of the rod electrode. With a plastic measuring tube wall, this has the effect that the plastic in stress-free areas "flows" and the electrode anchors shape-interlockingly in the bore. The electrode is thereby secured against being pushed out of the measuring tube as a result of an operating pressure. The measuring tube is furthermore sealed off from the outside environment by the shape-interlocking envelopment of the electrode shaft.

In the case of low wall thickness, for example in the case of measuring tubes with small nominal diameters, e.g. DN 15, standard electrodes with a reduced number of sealing lips are used. Trials have showed that in such cases, the prevention of an electrode being pushed out by higher operating pressures in the measuring tube can no longer be guaranteed. Furthermore, through the electrode's being pressed in, the bore will be widened by the sealing lip nearest the electrode head, so that sufficient material is no longer available for the shape-interlocking anchoring of the electrode and the following sealing lips are no longer wedged against the wall of the bore and no longer close off the wall of the bore with their maximum diameter. Especially in the case of plastic walls, there is a tendency for a part of the plastic to give way to the interior of the measuring tube due to mechanical stresses and form bulges there, which locally decreases the diameter of the measuring tube and in turn influences the flow of the liquid.

SUMMARY OF THE INVENTION

An object of the invention is to provide an electrode which securely seals the bore even at higher operating pressures.

The object is achieved in the invention by providing that, at least in one portion of the electrode shaft, the maximum diameter of a following sealing lip is greater than the maximum diameter of a preceding sealing lip. Through such a construction the electrode is secured against being pressed out as a result of an operating pressure and seals the measuring tube liquid-tightly.

In an advantageous embodiment, the electrode is inserted into the bore in such a manner that the electrode essentially terminates at the level of the interior side of the measuring tube. Consequently, the flow of the medium is not inhibited and a possible measurement error is eliminated.

In a favorable embodiment, after a sealing lip following the electrode head, the maximum diameter of any sealing lip following this first lip is always greater than the maximum diameter of the previous lip. In such case, the electrode head faces the medium. In this way, the sealing lips penetrate up to their maximum diameter into the wall of the bore, so that sufficient material is available around the bore to produce a shape-interlocking seal.

In a beneficial embodiment, beginning with the sealing lip lying nearest the electrode head, the maximum diameter of the successive sealing lips is larger than the maximum diameter of any previous sealing lip. This embodiment guarantees the greatest possible security against an electrode with a fixed number of sealing lips being pressed out by high operating pressures in the measuring tube.

In a useful version, the electrode exhibits an over-all conical form. As a measure of the conicity of an electrode, an angle can be specified which gives the slope of the jacket of the frustum relative to its cylindrical basic form. Through this over-all conical form, a sealing of the electrode with the wall of the bore can be assured, as well as a sealing-off of the measuring tube and an increased security against the electrode being pushed out due to an operating pressure.

In an advantageous variant, the wall of the measuring tube (at least in the vicinity of the bore) is composed of a plastically deformable material, for example a plastic. This allows for the form-fitting jacketing of the electrode shaft by the deformable material and assures an impermeable sealing and a stronger anchoring of the electrode in the bore, as any pressures that arise are distributed more evenly over the bearing surface between the plastic and electrode shaft.

In a purposeful realization, the wall of the measuring tube is made of PFA (Perfluoroalkoxyethylene) plastic. This possesses a low strength and hardness compared to other materials, is therefore easy to shape and can fill the space between the sealing lips. This further improves the anchoring of the electrode.

It is advantageous to use a rod electrode that possesses a cylindrical electrode head as well as an elongated electrode shaft and a socket for connection of a lead.

BRIEF DESCRIPTION OF THE DRAWINGS

The invention will now be explained in greater detail on the basis of the appended drawing; the figures of which show as follows.

DETAILED DISCUSSION IN CONJUNCTION WITH THE DRAWINGS

Figure 1:
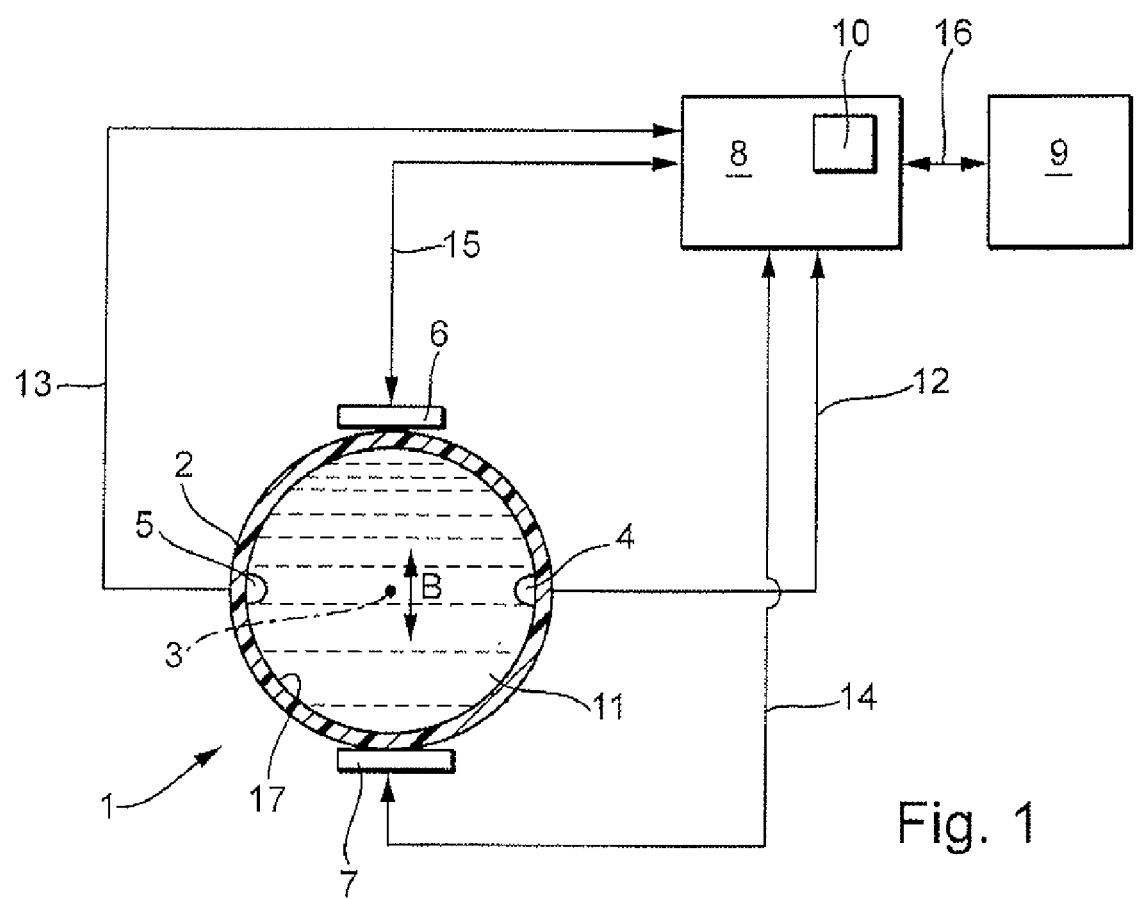
FIG. 1 is a schematic representation of an embodiment of an apparatus for measuring the volume, or mass, flow of a medium in a pipeline.

FIG. 1 shows a schematic representation of a magnetoinductive flow measuring device 1. The medium 11 flows through measuring tube 2 in the direction of the longitudinal axis 3 of the measuring tube 2. The medium 11 is at least slightly electrically conductive. In the event that the measuring tube 2 is made of an electrically conductive material, the measuring tube 2 must be coated on its inner surface with a non-conductive liner 17; the liner 17 should preferably be composed of a material that is highly chemically and/or mechanically resistant.

The alternating magnetic field B, which is directed perpendicularly to the flow direction of the medium 11, is produced via a magnet system, e.g. via two coils 6, 7 placed diametrally opposite to each other; or via two electromagnets.

The electrodes 4, 5 are two so-called rod electrodes, each exhibiting a cylindrical electrode head 20, an electrode shaft 22 installed longitudinally in the wall of the measuring tube 21 and a socket 19 for connection of electrical leads 12, 13.

Under the influence of the magnetic field B, the charge carriers located in the medium 11 migrate according to polarity to the two installed poled electrodes 4, 5. The measurement voltage that forms on the electrodes 4, 5 is proportional to the flow velocity of the medium 11 averaged over the cross-section of the measuring tube; that is to say, it is a measure for the volume flow rate of the medium 11 in the measuring tube 2. Via connecting elements (not separately shown in FIG. 1), e.g. flanges, the measuring tube 2 is connected with a pipeline, through which the medium 11 flows.

The electrodes 4, 5 are connected with the control/evaluation unit 8 via electrical connecting lines 12, 13. The connection between the coils 6, 7 and the control/evaluation unit 8 occurs via the electrical connecting line 16 connected with an input/output unit 9. Associated with the control/evaluation unit 8 is the storage unit 10.

Figure 2:
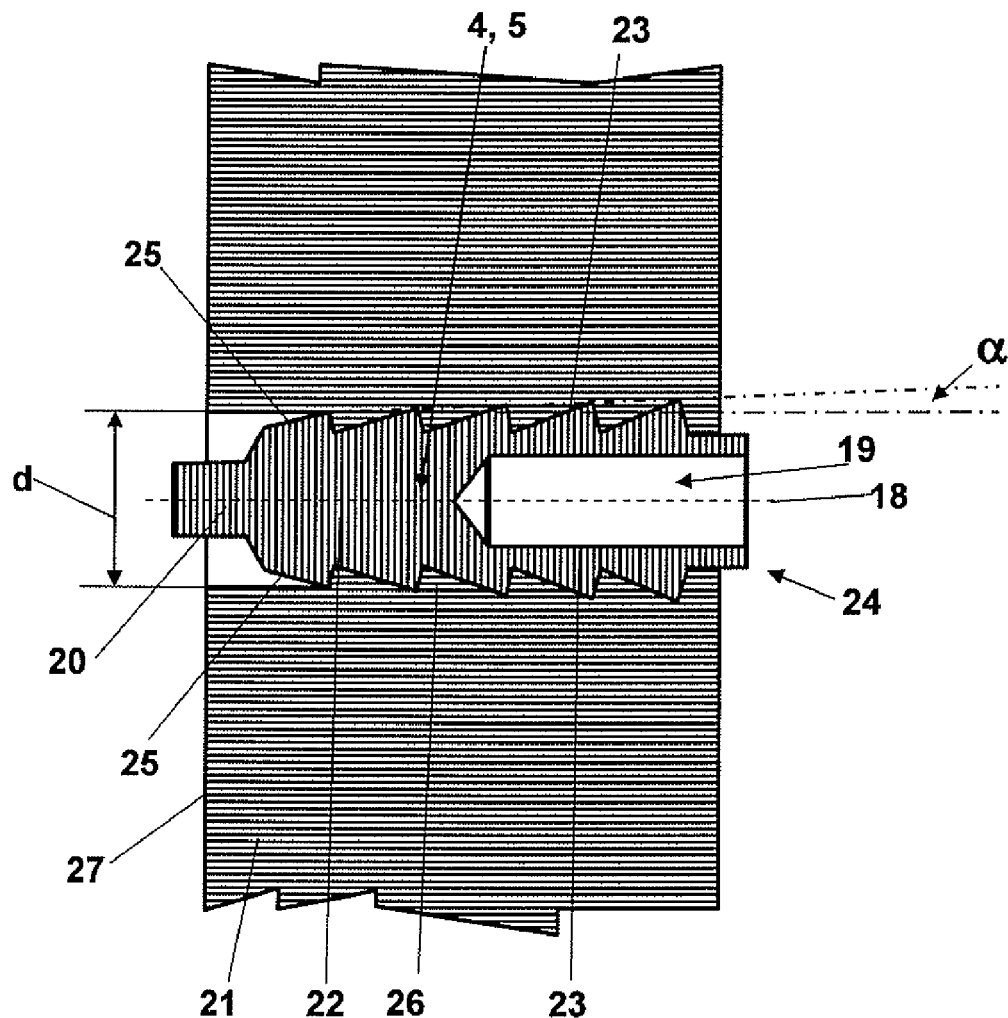
FIG. 2 is a cross section of an electrode of the invention, which is pressed into a measuring tube wall made of a plastic material.

FIG. 2 is a representation of a cross-section of an electrode 4, 5 of the invention pressed into the bore 24 in the wall of a measuring tube 21 composed of a plastic material.

An electrically conductive medium 11 (not explicitly shown), which flows through the measuring tube 2, couples with the electrode 4, 5, with which the measurement voltage can be tapped via a socket 19 in the electrode shaft 22. The electrode 4, 5 is made of a corrosion-resistant material, e.g tantalum, and the wall of the measuring tube 21 is made of an electrically non-conductive plastic material, for example the plastic PFA, which is used in many industrial fields on account of its properties.

The electrode head 20 terminates essentially with the inner side of the measuring tube 27, in order to avoid influencing the flow of the medium 11.

The surface of the electrode head 20 is exposed to the operating pressures produced by the medium 11. This pressure is made up of a static component, which is proportional to the contact surface between the medium and the electrode 4, 5; and a dynamic component, which is brought about by the flow velocity. The operating pressure pushes the electrode 4, 5 out of the bore 24 along its longitudinal axis 18.

The electrode's being pushed out is counteracted by the frustoconically shaped sealing lips 23 of the electrode shaft 22, which have anchored themselves in the material of the wall of the measuring tube 21. The sealing lips 23 are arranged as follows:

The maximum diameter of the first frustoconical sealing lip 25 following the electrode head 20 is greater than the maximum diameter d of the bore 24 in the wall of the measuring tube 21. The maximum diameter of second sealing lip 23 (following the first sealing lip 25 outwardly along the longitudinal axis 18) is greater than the maximum diameter of the first sealing lip 25. The maximum diameter of the third sealing lip 23 (following the second sealing lip 23 outwardly along the longitudinal axis 18) is in turn greater than the maximum diameter of the second sealing lip 23, and thus greater than the maximum diameter of the first sealing lip 25. The same applies to the subsequent sealing lips 23.

The maximum diameter of the fifth sealing lip 23 (following the fourth sealing lip 23 outwardly along the longitudinal axis 18) is greater than the diameter of the fourth sealing lip 23, and has the greatest maximum diameter of all sealing lips 23.

The greater maximum diameter of the sealing lips 23 that follow the first sealing lip 25 results in a penetration of the edges of the sealing lips 23 beyond the edge of the bore 24 into the plastic material surrounding the bore 24.

The Christmas-tree-like, over-all conical shape of the electrode 4, 5 with fluke-like, frustoconically shaped sealing lips 23 and the undercuts 26, which are filled with plastically deformable material (e.g. a plastic) from the area surrounding the bore 24, provide additional support against the operating pressure.

An angle α can be determined, which gives the degree of conicity of the electrode shaft 22 relative to the cylindrical basic form. The angle α forms the intersection of two lines.

Considered here is a cross section containing the longitudinal axis 18 of the electrode 4, 5. Since the longitudinal axis divides the cross-section symmetrically, only one of the symmetrical halves will be considered in the following:

The first line runs parallel to the longitudinal axis 18 through the edge of the bore 24. The point of intersection of the two lines is the point where the first sealing lip 25 touches the wall of the bore 24. The second line runs through the point where the first sealing lip 25 touches the wall of the bore 24 and through the point of maximum diameter in the wall of the measuring tube 21, at the last of those sealing lips 23 of the electrode 4, 5 which follow the electrode head 20.

By virtue of its conicity, the electrode 4, 5 exhibits a stronger anchoring in the wall of the measuring tube 21 and the electrode 4, 5 is better secured against being pushed out as a result of an interior pressure.

The invention claimed is:

1. An electrode for a magneto-inductive flow measuring device for determining volume flow of an electrically conductive medium flowing through a measuring tube, wherein the measuring tube, or at least the portion of it which comes in contact with the medium, is not electrically conductive, the electrode has:
    an electrode shaft with an electrode head; wherein:
    said electrode head contacts the medium;
    said electrode shaft exhibits a plurality of frustoconical sealing lips arranged one after the other in the direction of the longitudinal axis of the electrode;
    said electrode shaft is pressed into a bore in the wall of the measuring tube;
    the maximum diameter of said sealing lip nearest said electrode head is greater than the diameter of said bore; and
    at least in a portion of said electrode shaft, the maximum diameter of a following sealing lip is greater than the maximum diameter of a preceding sealing lip.

2. The electrode as claimed in claim 1, wherein:
the electrode is anchored in said bore in such a manner that said electrode head terminates essentially at the level of the inner side of the measuring tube.

3. The electrode as claimed in claim 1, wherein:
the maximum diameter of each of said following frustoconically shaped sealing lip increases as the distance from said electrode head increases.

4. The electrode as claimed in claim 1, wherein:
beginning with the sealing lip nearest said electrode head, the maximum diameter of any sealing lip is greater than that of the preceding sealing lip.

5. The electrode as claimed in claim 1, wherein:
the electrode has an over-all conical shape.

6. The electrode as claimed in claim 1, wherein:
at least in the area of said bore, the wall of the measuring tube is made of a plastically deformable material.

7. The electrode as claimed in claim 6, wherein:
at least in the area of said bore, the wall of the measuring tube is made of PFA (Perfluoroalkoxyethylene) plastic.

8. The electrode as claimed in claim 1, wherein:
the electrode is a rod electrode.

9. A magneto-inductive flow meter for determining volume flow of an electrically conductive medium, comprising:
    a measuring tube through which the medium flows, wherein said measuring tube, or at least a portion thereof which comes in contact with the medium, is not electrically conductive; and
    an electrode having an electrode shaft with an electrode head, wherein:
    said electrode head contacts the medium;
    said electrode shaft exhibits a plurality of frustoconical sealing lips arranged one after the other in the direction of longitudinal axis of said electrode;
    said electrode shaft is pressed into a bore in the wall of said measuring tube;
    the maximum diameter of said sealing lip nearest said electrode head is greater than the diameter of said bore; and
    at least in a portion of said electrode shaft, the maximum diameter of a following sealing lip is greater than the maximum diameter of a preceding sealing lip.

* * * * *